United States Patent [19]
Roesler et al.

[11] Patent Number: 6,070,369
[45] Date of Patent: Jun. 6, 2000

[54] PERSON TRANSPORT VEHICLE

[75] Inventors: Joerg Roesler, Feucht; Emil Veit-Salomon, Nuernberg, both of Germany

[73] Assignee: ABB Daimler-Benz Transportation (Deutschland) GmbH, Henningsdorf, Germany

[21] Appl. No.: 08/981,149

[22] PCT Filed: Jun. 4, 1996

[86] PCT No.: PCT/EP96/02415

§ 371 Date: Dec. 10, 1997

§ 102(e) Date: Dec. 10, 1997

[87] PCT Pub. No.: WO96/41740

PCT Pub. Date: Dec. 27, 1996

[30] Foreign Application Priority Data

Jun. 10, 1995 [DE] Germany .......................... 195 21 192

[51] Int. Cl.[7] .............................. B61D 17/12; B62D 25/07
[52] U.S. Cl. ............................. 52/45; 105/396; 105/401; 296/210; 454/99; 52/50
[58] Field of Search .................................. 52/44–56, 17; 454/99, 103, 136, 137; 105/396, 397, 399, 401, 404, 407, 409, 424; 796/40

[56] References Cited

U.S. PATENT DOCUMENTS

| | | | |
|---|---|---|---|
| 1,722,590 | 7/1929 | Miller | 454/136 X |
| 2,292,192 | 8/1942 | Bergstrom . | |
| 2,340,252 | 1/1944 | Palmer | 454/99 |
| 2,422,560 | 6/1947 | Palmer . | |
| 2,424,828 | 7/1947 | Keep | 454/99 |
| 2,640,409 | 6/1953 | Hans | 454/99 |
| 2,923,223 | 2/1960 | Fall | 454/99 |
| 3,151,538 | 10/1964 | Dean | 454/99 |
| 3,159,089 | 12/1964 | Eggert, Jr. | 454/99 |
| 5,066,067 | 11/1991 | Ferdows . | |
| 5,333,554 | 8/1994 | Yamada et al. . | |

FOREIGN PATENT DOCUMENTS

| | | | |
|---|---|---|---|
| 597198 | 5/1960 | Canada | 52/45 |
| 0013940 | 8/1980 | European Pat. Off. . | |
| 0115059 | 8/1984 | European Pat. Off. . | |
| 2952371 | 7/1980 | Germany . | |
| 3608306 | 9/1987 | Germany . | |
| 2033073 | 5/1980 | United Kingdom . | |
| 93/19965 | 10/1993 | WIPO . | |

*Primary Examiner*—Richard Chilcot
*Attorney, Agent, or Firm*—Venable; George Spencer; Norman N. Kunitz

[57] ABSTRACT

In a person transport vehicle, a roof structure is fixed on longitudinal sidewalls (1). In order to achieve a simple but highly functional structure, a longitudinal beam (3) for the roof is fixed to the area of the top side edges of each longitudinal side wall (1) and is provided with an at least approximately horizontal leg. The horizontal legs extend toward each other and carry in a weld-free and watertight manner an inherently stable roof plate (5) provided with integrated longitudinal channels (6, 7).

20 Claims, 1 Drawing Sheet

PERSON TRANSPORT VEHICLE

BACKGROUND OF THE INVENTION

The invention relates to a passenger transport vehicle, particularly a rail vehicle or the like, having a coach body on which a roof structure is fastened on longitudinal side walls of the coach body.

For rail vehicles in general, it is known to close off a coach body accommodating the passengers to be transported toward the top with a roof structure which is fixed on the longitudinal side walls. For this purpose, a roof closure sheet metal piece is usually fixed tightly and permanently on the remainder of the coach body structure by welding or riveting along the outer edge of the roof closure sheet metal piece. This creates a considerable tightening and aligning expenditure during the production process and, later, measures are necessary to create conduits for the air supply and air exhaust, for cables and for insulation against sound and heat losses.

It is the object of the invention to provide measures for a passenger transport vehicle according to the preamble of the first claim by means of which measures the production and the assembly can be carried out in a simple manner.

SUMMARY OF THE INVENTION

The above object generally is achieved according to the present invention by a passenger transport vehicle, particularly a rail vehicle or the like, having a coach body on which a roof structure is fastened on longitudinal side walls of the coach body, and wherein: in the region of the respective longitudinal side walls, a respective longitudinal roof girder is fastened with the roof girders each having an approximately horizontal leg which are oriented toward each other; and a roof closure plate having integrated conduits is attached to the free ends of the respective legs on oppositely disposed longitudinal edges without weld joints and in a watertight manner.

For a design of a passenger transport vehicle according to the invention, longitudinal girders that are fixed at the upper lateral edges of the longitudinal side walls of the coach body are used as support for a prefabricated roof closure plate so as to create a functionally integrated roof closure; the roof closure plate is designed as an inherently supporting member and is provided with conduits in which the air flows can be guided that are necessary for the air supply and air exhaust of the interior chamber of the coach body and/or in which electrical, hydraulic or pneumatic supply lines or control lines can be accommodated. The conduits designed for the air supply and air exhaust have openings which are open toward the passenger compartment and are also connected via openings in other wall sections with the outside atmosphere or an air conditioning apparatus comprising at least one fan. Here, the conduit or conduits designed for the fresh air supply are arranged in the center or outer region of the roof closure plate and have blow-out connection pieces which are oriented toward the passenger compartment and extend through a ceiling covering. In contrast, the further conduits, which are designed for the exhaust air conduction and are disposed particularly at the outer or inner longitudinal side edges, take in the exhaust air exiting from the passenger compartment in the region of the windows or the side walls and guide it directly into the open atmosphere. While, during this process, the conduits designed for the fresh air supply are closed on their frontal ends, the adjoining openings of the conduits designed for the exhaust air conduction are connected at the respective ends on the frontal end by means of a transverse conduit from which the exhaust air can flow over a large surface. For the supply of the conduits designed for the conduction of the supply air, an air conditioning apparatus can be arranged above the roof closure plate, which air conditioning apparatus comprises at least one fan for moving the air, optionally also an air conditioner, and moves supply air in particular into the center conduit or conduits of the roof closure plate. Here, the air conditioning apparatus is preferably standing on longitudinal supporting ribs which extend in the longitudinal direction of the coach parallel to the longitudinal side edges of the roof closure plate and are formed upward in one piece from the longitudinal girders fixed on the side walls. But the air conditioning apparatus can also be fastened directly on the roof closure plate. The longitudinal supporting ribs increase the rigidity of the longitudinal girders, with the space between these longitudinal supporting ribs being used to accommodate the roof closure plate. With regard to its air flow, the air conditioning apparatus arranged immediately above can thus be connected with the air conveying arrangements by way of simple attached connection pieces via adapted openings in the upper outer wall of the roof closure plate. Preferably, inside of the passenger compartment, an air deflecting shield extends across the blowout connection pieces of the associated conduits, which connection pieces are oriented downward into the passenger compartment; a lighting device is integrated into the air deflecting shield whose covering can simultaneously form the air deflecting shield. Preferably, a receiving groove which is open on one side toward the light is disposed in the roof closure plate in the region between these blowout connection pieces; preferably electrical supply lines and control lines are held in the receiving groove. It is particularly advantageous to make the roof closure plate from a plastic material, with it being possible that particularly the outer wall has a higher heat transfer resistance than the inner wall, which can be accomplished by way of the material thickness or the material selection. But the roof closure plate can also be configured as a multilayered, sandwich-type plate with integrated conduits which extend longitudinally or transversely. The roof closure plate, which, only in its outer edge region, sits on the free ends of the longitudinal girders can additionally be supported by roof arches which extend from one longitudinal girder to another and are fixed to the same or to the relevant side wall. Here, the closure plate can be made as an extruded member by means of the plastics injection molding process or by means of sandwich construction from two plates having perpendicular separating ribs for the shaping of the conduits. Additionally, profiled sections can be formed on the roof closure plate, which profiled sections may serve for the fastening of apparatuses, pipes or the like. Furthermore, it is possible to preassemble the roof closure plate with the associated gear and installation means independently of the coach body; subsequently it merely needs to be lifted by a crane onto the prepared vehicle and be fastened to the longitudinal girders with a seal being placed in between along the outer supporting edge. Subsequent treatment is then no longer necessary. In this context, the seal can be formed by a rubber-elastic band or the like or also by means of an adhesive, in particular, a permanently elastic one. The sealing takes place at a precisely defined interface and can thus be implemented without problems.

In the following, the invention is explained in greater detail by way of a cross sectional representation in the roof region of the coach body of a passenger transport vehicle.

DETAILED DESCRIPTION OF THE PREFERRED EMBODIMENT

Figure 1:
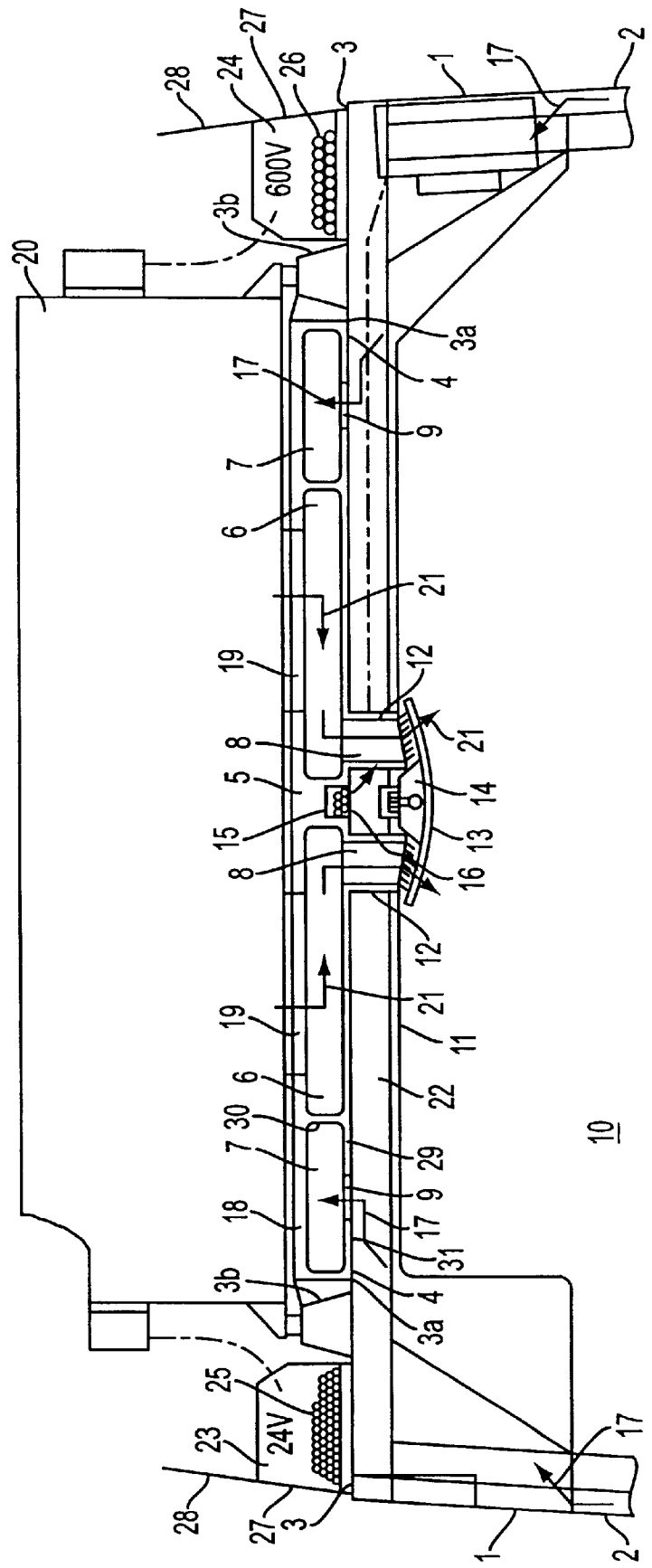
FIG. 1 is a schematic cross sectional view of the upper portion of a vehicle body according to the invention.

FIG. 1 shows the upper sections of outer, at least largely vertical longitudinal side walls 1 of a passenger transport vehicle which is configured, for example, as a streetcar vehicle, with windows 2 being disposed in the longitudinal side walls. The longitudinal side walls 1 have two shells having support elements, thermal elements and noise-insulating elements in between them and having an outer metallic wall surface. One angle-shaped longitudinal girder 3 each is fixed in the region of the upper side edges of the longitudinal side walls 1. An at least approximately horizontal leg of each longitudinal girder is oriented toward the longitudinal center of the vehicle. The free clearance between the longitudinal edges 4 of the horizontal legs of the longitudinal girders 3, which longitudinal edges are oriented toward one another, is bridged by a roof closure plate 5 configured as an independent structural unit; the roof closure plate extends in the direction of the longitudinal axis of the coach body and is only supported with its outer longitudinal edges on the oppositely disposed free ends 3a of the respective legs in a watertight manner. A sealing cord, sealing band or the like 31 can be inserted as a seal in-between the longitudinal edges and the free ends 3a of the longitudinal girders; but a permanently elastic adhesive can also be used as a seal. The roof closure plate 5 can be tightened with the respective longitudinal girder 3 by way of conventional tightening means. Then, the roof closure plate 5 is fixed in a watertight manner on the longitudinal girders 3 without weld joints. The roof closure plate 5 can be made, in particular, in one piece as an extruded section or preferably from a plastic material; during this process, it can be provided with several conduits 6 or 7 extending in the longitudinal direction horizontally next to one another in the installed position. At least two of the conduits 6, 7, in the present case all four that are shown, are configured as air conduction conduits and are each provided with at least one opening 8 or 9 open toward the passenger compartment 10 that is configured in the interior of the coach body. The two conduits 6 which are disposed on the inside and serve as supply air conduction have at their respective opening 8 a blowout connection piece 12 which extends through the ceiling covering 11 of the passenger compartment 10, with which connection piece a common air deflecting shield 13 with an integrated lighting device 14 is associated in the interior chamber 10 upstream of their blowout openings which are disposed relatively closely next to one another. In-between the blowout connection pieces 12 or the associated conduits 6, there is a receiving groove 15 in a separating rib of the roof closure plate 5, which groove is open toward the lighting device 14 and in which preferably electrical lines 16 are held, for example, for the power supply and control of the lighting device 14. Exhaust air can flow from the interior chamber 10 of the passenger compartment according to the arrows 17, for example, in the region of the windows 2, through the side walls 1 behind the ceiling covering 11 and from there through the openings 9 into the further conduits 7 of the roof closure plate 5 intended for exhaust air conduction. The conduits 6 designed for the air supply are each closed at both ends in the axial direction and have openings 19 in the outer wall 18 of the roof closure plate 5; the openings are communicating via connection pieces with an air conduction system in an air conditioning apparatus 20 that is arranged closely above the roof closure plate 5. The air conditioning apparatus 20 moves conditioned air into the interior chamber 10 according to the arrows 21. The further outwardly disposed conduits 7 can each be open on both ends in the longitudinal direction and are connected with one another at these frontal ends respectively via a transverse conduit from which the exhaust air can escape into the open atmosphere.

For the fastening of the air conditioning apparatus 20, the two longitudinal girders 3 are provided in the region of the free leg ends 3a with longitudinal supporting ribs 3b, which are formed in one piece toward the top and extend laterally along the roof closure plate 5, and on which the air conditioning apparatus 20 is supported which extends over the entire width of the roof closure plate 5. These longitudinal support ribs 3b simultaneously effect a stiffening of the longitudinal girders 3 and create the space in the height direction that is necessary to accommodate the roof closure plate 5.

Transverse roof arches 22 serve to support the horizontal legs 3a, 3b of the longitudinal girders 3 as well as the roof closure plate 5 and to increase the coach body stability; the arches are fixed on the downwardly extending leg of the longitudinal girders 3 or directly on the respective longitudinal side walls 1 and they extend from one longitudinal side wall 1 to the other longitudinal side wall 1. In order to provide the outer wall 18 of the roof closure plate 5 with increased noise-insulating and heat-insulating properties, its material thickness is greater than that of the inner wall 29 of the roof closure plate 5 that extends parallel to it. The absence of transverse roof arches 22, be omitted if the inherent rigidity and load-bearing capacity of the roof closure plate 5 are sufficient so that its inner wall can simultaneously form the visible ceiling wall of the passenger compartment. In particular, transverse roof arches can also be integrated into the roof closure plate 5 between inner wall 29 and outer wall 18 so as to accomplish the same effect, while the conduits 6, 7 can also be oriented transversely to the longitudinal direction of the coach body.

Moreover, the roof closure plate 5 can also be made in the manner of a sandwich plate from two originally independent inner or outer walls 30 between which vertical partition walls are inserted for forming the integrated conduits and for closure toward the outside and to which the partition walls are fastened. In this context, the outer wall can be made from a material having particularly good noise insulation and thermal insulation. Furthermore, there is a separate cable conduit 23 or 24 respectively between a longitudinal supporting rib 3b and a plane that is determined approximately by the longitudinal side walls 1; electrical cables 25 for, e. g., 24 volt control or supply purposes and, on the other hand, cables 26 for, e. g., 600 volt consumers or loads are installed in the cable conduit. The outer walls 27 of the cable conduits 23, 24 are preferably disposed in the plane that is predetermined by the longitudinal side walls 1 and, with extensions 28 extended toward the top, they serve to cover the roof structures 3b, 5, 20. In addition, it is also possible to provide supply air conduits and apparatus receivers disposed on the outside on the roof closure plate.

We claim:

1. A passenger transport rail vehicle, having a coach body on which a roof structure is fastened on longitudinal side walls, and wherein: in the region of the respective upper side edge of each of the longitudinal side walls (1), one longitudinal roof girder (3) is fastened, with the girders being oriented toward one another with an at least approximately horizontal leg; and a roof closure plate (5) having integrated conduits (6, 7) is attached to free ends (3a) of the respective horizontal legs by oppositely disposed longitudinal edges of the roof closure plate without weld joints and in a watertight manner.

2. A passenger transport vehicle having a coach body on which a roof closure plate with interior conduits for ventilation of the coach body interior chamber is fastened on longitudinal side walls of the coach body, and wherein:

the roof closure plate (5) is an independent structural component, composed of an inner wall (29), a parallel extending outer wall (18), and separating walls (30) that are inserted in-between the inner and outer walls and extend perpendicular thereto to form the conduits (6, 7);

a respective angle-shaped longitudinal roof girder (3) is fixedly attached in a region of the upper side edges of each of the longitudinal side walls (1), with the longitudinal roof girders (3) each have one nearly horizontal leg, and with longitudinal edges (4) of the respective horizontal legs pointing toward a center of the coach body;

the roof closure plate (5) is supported with its outer longitudinal edges on respective end segments (3a) of the horizontal legs;

a seal (31) for a water-tight connection is inserted between the end segments (3a) of the respective horizontal legs and the roof closure plate (5); and, the roof closure plate (5) is attached to the longitudinal roof girders (3).

3. A passenger transport vehicle according to claim 2, characterized in that at least two conduits (6, 7) are configured as air conduction conduits and are each provided with at least one opening (8, 9) toward the interior chamber (10) of the coach body and have at least one opening (19) that is oriented toward the outside.

4. A passenger transport vehicle according to claim 3, wherein for one said channel (6), a blow-out connection piece (12) that is oriented into the interior chamber (10) is tightly attached at an opening (8), which blow-out connection piece extends narrowly through a ceiling covering (11) and discharges into the interior chamber (10), while an associated outer opening (19) is provided in the oppositely disposed outer wall (18) of this conduit (6).

5. A passenger transport vehicle according to claim 3, wherein at least one further conduit (7) discharges into the open atmosphere on at least one frontal end.

6. A passenger transport vehicle according to claim 2, wherein four conduits (6,7) extending parallel to one another are provided in the roof closure plate (5), with two center conduits (6) being provided with blow-out connection pieces (12) that discharge into the interior chamber (10) and are closed on their frontal ends, and with the outer conduits (7) being connected on the frontal end to a transverse conduit having exhaust air openings that discharge into the open atmosphere.

7. A passenger transport vehicle according to claim 3, wherein above the roof closure plate (5), an air conditioning apparatus (20) is arranged which communicates with the outer opening (19) of at least one of the associated conduits.

8. A passenger transport vehicle according to claim 4, wherein an air deflecting shield (13) having an integrated lighting device (14) is arranged in front of the blow-out openings of the blow-out connection pieces (12).

9. A passenger transport vehicle according to claim 2, wherein at least one receiving groove (15) that is open on one end is provided in the roof closure plate (5).

10. A passenger transport vehicle according to claim 2, wherein the longitudinal girders (3) are provided with upwardly extending integrally formed longitudinal supporting ribs (3b) which are shaped trapezoidally and toward the tops which extend laterally next to the roof closure plate (5) and on which an air conditioning apparatus (20) is supported.

11. A passenger transport vehicle according to claim 2, wherein the roof closure plate (5) is made from plastics.

12. A passenger transport vehicle according to claim 11, wherein the outer wall (18) of the roof closure plate (5) has a greater heat transfer resistance than the inner wall.

13. A passenger transport vehicle according to claim 2, wherein the roof closure plate (5) rests on at least one roof arch (22) which extends from one longitudinal girder to the other (3, 3) or from one longitudinal side wall to the other (1, 1).

14. A passenger transport vehicle according to claim 1, wherein the roof closure plate (5) is constructed from an inner wall and an outer wall with perpendicular partition walls inserted in-between and fastened thereon.

15. A passenger transport vehicle according to claim 2, wherein, parallel to at least one longitudinal supporting rib (3b), a cable conduit (23, 24) is provided on the side that is facing away from the roof closure plate (5).

16. A passenger transport vehicle according to claim 2, wherein at least the conduits (6, 7) intended for air conduction extend as longitudinal conduits at least approximately parallel to the longitudinal side edges of the roof closure plate (5).

17. A passenger transport vehicle according to claim 2, characterized in that at least the conduits (6, 7) intended for air conduction extend at least approximately parallel to the transverse side edges of the roof closure plate (5).

18. A passenger transport vehicle according to claim 2, wherein the vehicle is a rail vehicle.

19. A passenger transport vehicle according to claim 18, wherein the rail vehicle is a streetcar.

20. A passenger transport vehicle having a coach body on which a roof structure is fastened on longitudinal side walls (1) of the coach body, and wherein: in the region of each of the respective longitudinal side walls (1), a respective longitudinal roof girder (3) is fastened with the roof girders each having a respective approximately horizontal leg with the respective legs being oriented toward each other; a roof closure plate (5) having integrated conduits (6,7) is attached with its oppositely disposed longitudinal edges to free ends (3a) of the respective legs without weld joints and in a watertight manner; the longitudinal girders (3) are provided with upwardly extending integrally formed longitudinal supporting ribs (3b) which are shaped trapezoidally toward the top, which extend laterally next to longitudinal edges of the roof closure plate (5), and on which an air conditioning apparatus (20) is supported.

* * * * *